(12) United States Patent
Van Pul

(10) Patent No.: US 6,311,824 B1
(45) Date of Patent: Nov. 6, 2001

(54) ROTATABLE PICK-UP DEVICE

(75) Inventor: Leonardus Josephus Maria Van Pul, Halsteren (NL)

(73) Assignee: Klockner Hansel Tevopharm B.V., Schiedam (NL)

(*) Notice: Subject to any disclaimer, the term of this patent is extended or adjusted under 35 U.S.C. 154(b) by 0 days.

(21) Appl. No.: 09/560,333

(22) Filed: Apr. 28, 2000

(30) Foreign Application Priority Data

Apr. 29, 1999 (NL) .................................................... 1011939
Sep. 6, 1999 (NL) .................................................... 1012982

(51) Int. Cl.$^7$ .................................................... B65G 47/24
(52) U.S. Cl. ................ 198/377.08; 198/374; 198/370.12
(58) Field of Search .............................. 198/370.12, 374, 198/377.08

(56) References Cited

U.S. PATENT DOCUMENTS

| | | | |
|---|---|---|---|
| 3,721,340 | * | 3/1973 | Kruse et al. ..................... 198/370.12 |
| 4,391,372 | * | 7/1983 | Calhoun ......................... 198/370.12 |
| 4,558,555 | | 12/1985 | Rueff et al. . |
| 5,400,574 | * | 3/1995 | Spatafora ........................ 198/377.08 |
| 5,921,375 | * | 7/1999 | van Laar ......................... 198/370.12 |
| 5,988,354 | * | 11/1999 | Spatafora et al. ................... 198/374 |
| 6,109,419 | * | 8/2000 | Spatafora et al. ............... 198/377.08 |

FOREIGN PATENT DOCUMENTS

| | | |
|---|---|---|
| 2551538A1 | 5/1977 | (DE) . |
| 19605265A1 | 8/1996 | (DE) . |

* cited by examiner

*Primary Examiner*—Joseph E. Valenza
(74) *Attorney, Agent, or Firm*—Young & Thompson

(57) ABSTRACT

The invention relates to a rotatable gripper device (1) for picking up and rotating products which are supplied on a conveyor belt. The device according to the invention comprises a gripper head (2, 3) which can rotate about a vertical central shaft (4) and has a gripping member (18) which can rotate about its axis. For upward and downward movement, the device comprises a first cam roller (6, 7) and cam discs (8), and for rotation about the axis comprises a second cam roller (9, 10) and cam disc (11). The device according to the invention is of a simple and relatively lightweight design, so that it is suitable for operating at high speeds. The gripper device according to the invention can be used to accurately set the rotational path of the gripping member (18) at the gripping position and the release position, by means of the shape of the cam disc, in order to produce a gradual transfer. A large number of rotational patterns can be obtained by rotation of the gripper heads along a vacuum distributor plate with two or more vacuum ports.

7 Claims, 4 Drawing Sheets

Figure 1:
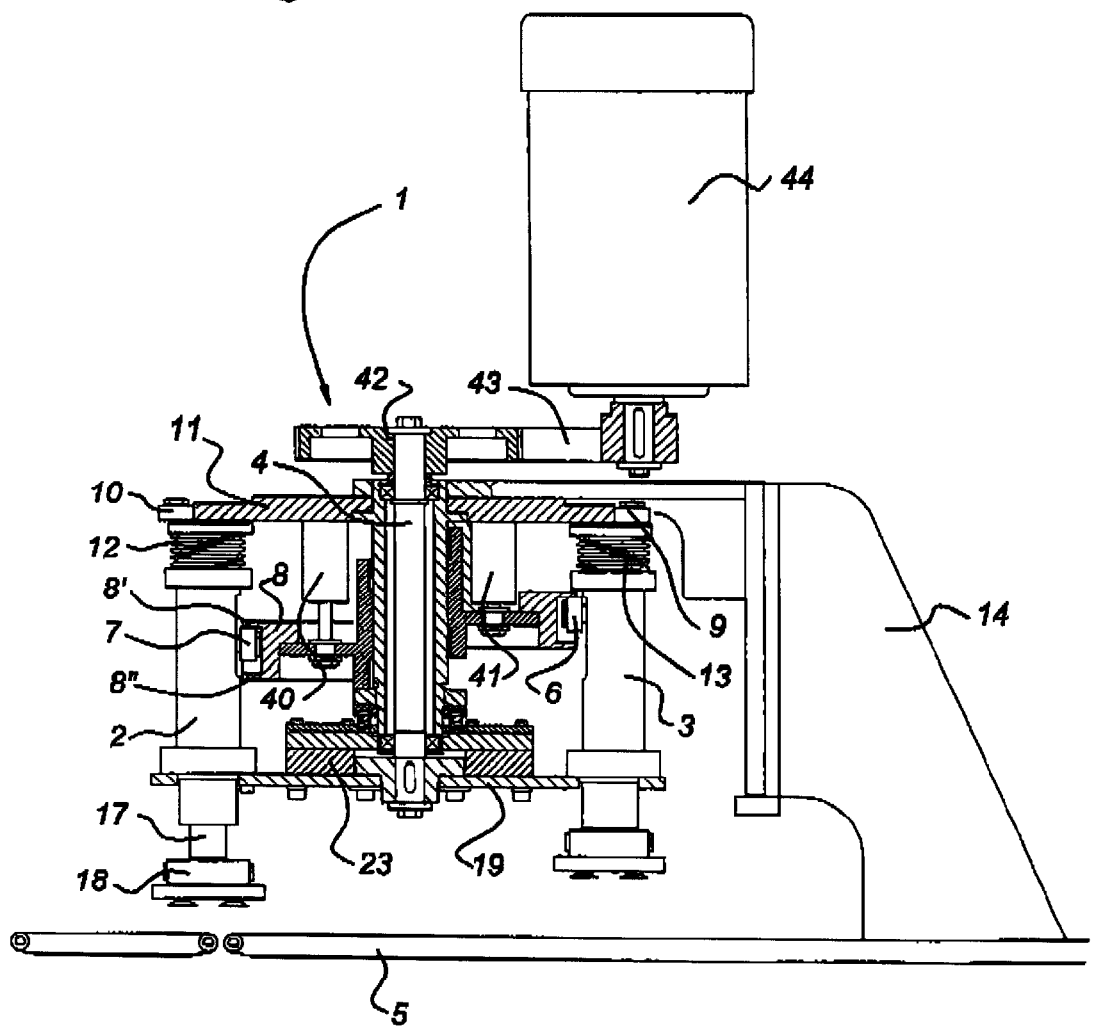

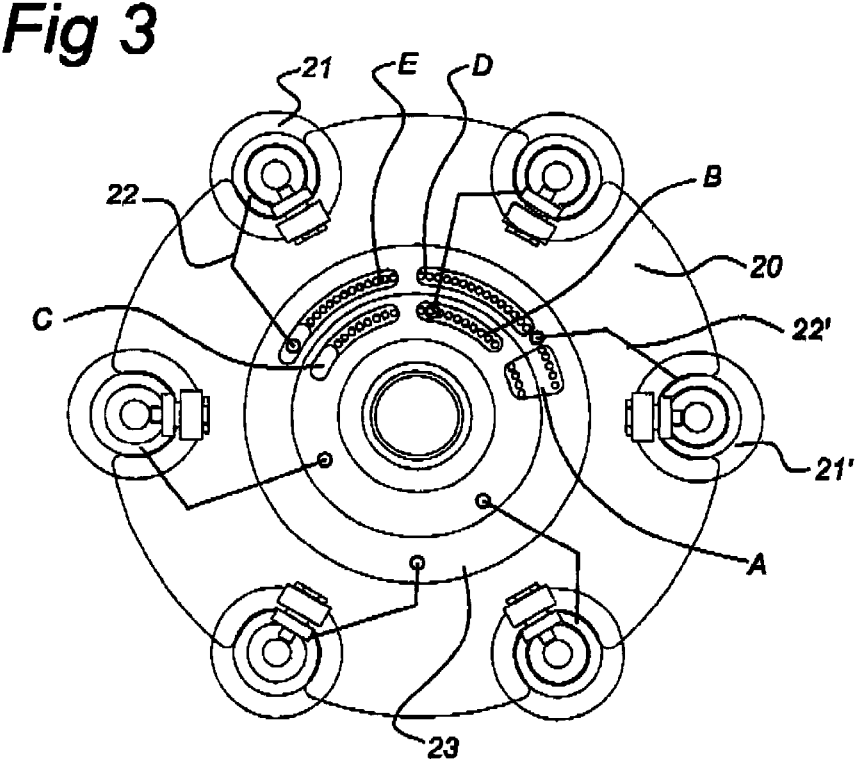
Fig 3
Fig 4a
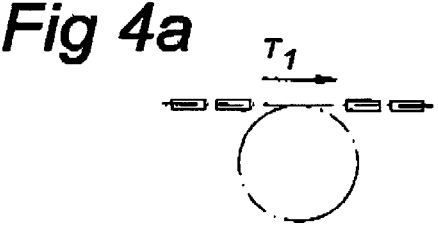
Fig 4b
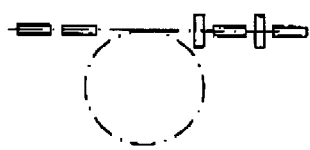
Fig 4c
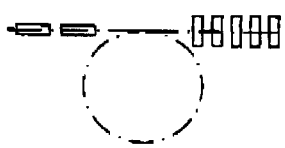
Fig 4d
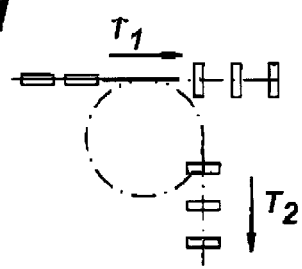
Fig 4e
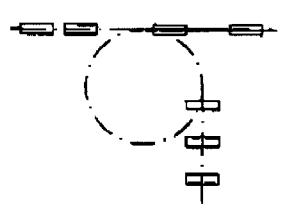
Fig 4f
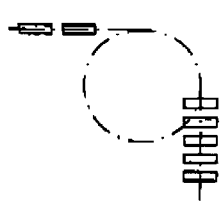

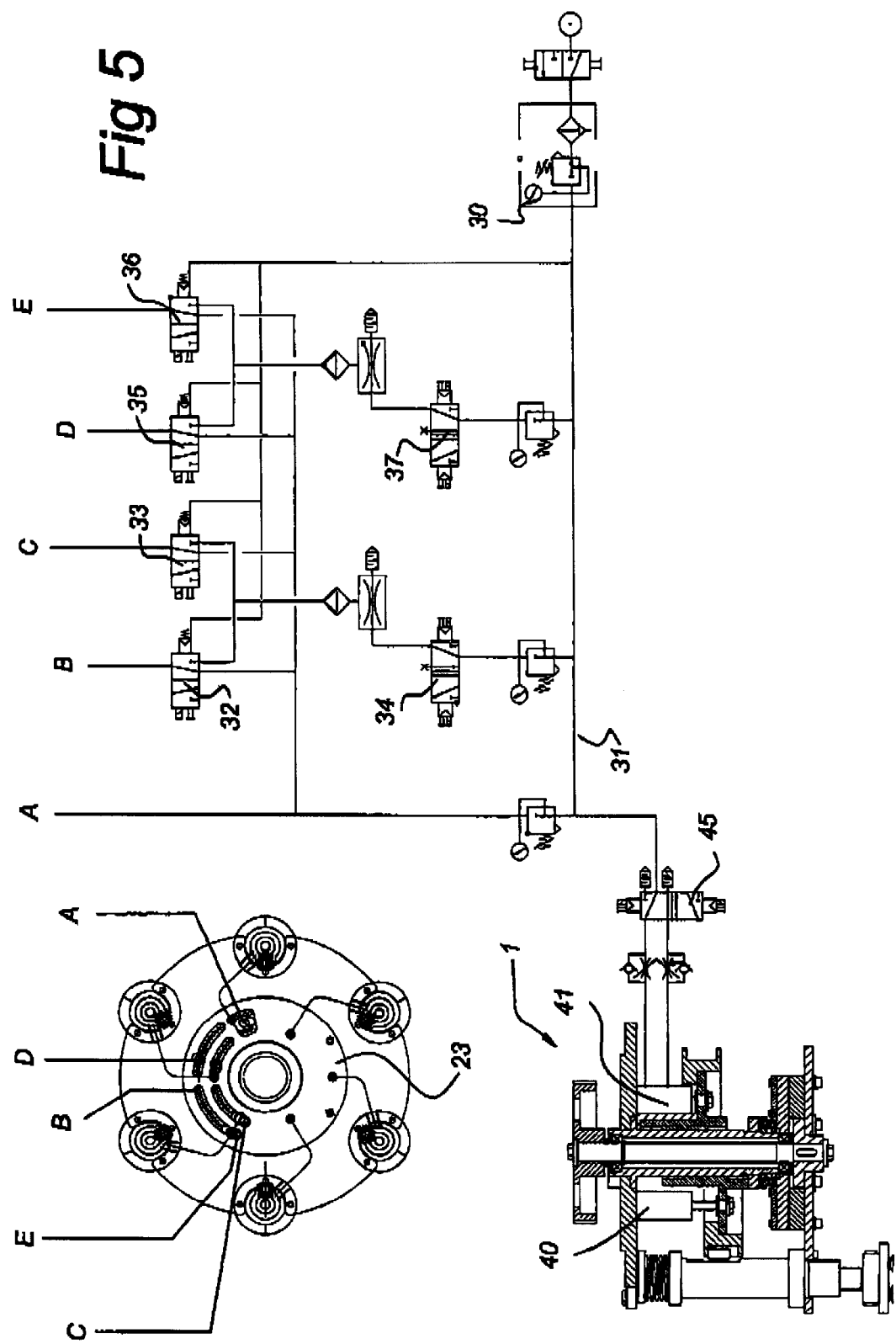

ROTATABLE PICK-UP DEVICE

The invention relates to a rotatable gripper device for picking up and rotating a product which is supplied on a conveyor belt, comprising a gripper head with a gripping member which can rotate about a vertical central shaft and about an axis of the gripper head, and a cam wheel which is connected to the gripping member and runs over a running surface of a cam disc which is located transversely on the central shaft, when the gripper head rotates about the central shaft, the position of which running surface varies along the central shaft in a circumferential direction around the central shaft, for the purpose of displacing the gripper head between a lowered gripping position and a retracted conveying position.

Rotatable gripper devices for picking up a series of products supplied by means of vacuum, in order to change the direction in which these products are conveyed before they are fed to a packaging device, such as a flow wrap packer, are known per se. EP-A-0,895,951 has disclosed a station for turning absorbent products, in which the gripper heads are rotated along an epicyclic path about a central shaft. The products which are oriented in the longitudinal direction of the product on a conveyor belt are lifted up by a gripper head, rotated and released in the transverse direction of the product to a downstream conveyor belt. Rotation of the gripper head about the central shaft and about its axis is effected by means of a relatively complex planetary gear system, while the lifting movement of the gripper head is driven by two levers which are under spring stress and engage on a sliding bush of the gripper head. The top lever of the known gripper device is provided, at a first end, with a cam roller which rolls along a cam track, the running surface of which, as seen in the circumferential direction, varies in height along the central shaft. Via a vertical transmission arm and a connected second lever, the sliding bush of the gripper head is displaced upwards, counter to the stress of a coil spring which is positioned around the sliding bush, into a conveying position. When the cam roller rolls further along the cam track, the gripper head returns to its lowered gripping position under the influence of the spring pressure.

The known turning station has the drawback that the drive mechanism for rotating the gripper head about the central shaft and for the upward and downward displacement of the gripper head is relatively complex. Furthermore, the large number of components employed means that the mass of the known device is relatively great, with the result that at high speeds problems associated with the inertia forces generated may arise. Also, the rotation of the gripper head about its axis is linked to and dependent on the movement of the gripper head around the central shaft, so that the movement of the gripper head in the area where a product is picked up and put down is difficult to adjust. Therefore, one object of the invention is to provide a gripper device which is of relatively simple design. Another object of the invention is to provide a gripper device in which the rotating mass is minimized and which can be used to produce a large number of product orientations. Another object of the invention is to provide a gripper device which can be used to rotate products with a small displacement of the gripper. A further object of the present invention is to provide a gripper device which can be deployed at a large number of positions and in which at-rest positions for picking up and putting down products can be set.

To this end, a gripper device according to the invention is characterized in that the gripper head comprises a support bush in which a sliding bush, to which the cam wheel is attached, is slidably mounted, the support bush being provided with an opening through which the cam wheel projects in the radial direction to outside the support bush, a suspension member being accommodated rotatably inside the sliding bush, with the gripping member at a bottom end, to which suspension member a second cam wheel is connected, and the gripper device being provided with a second cam disc, which lies transversely with respect to the central shaft and has a running surface, against which the second cam wheel is supported, and the distance of which from the central shaft varies in a circumferential direction about the central shaft, for rotation of the gripping member about the axis in the event of rotation of the gripping member about the central shaft.

Since the vertical displacement of the ripper head and its rotation about the axis are controlled by separate cam discs, a simple and lightweight structure is obtained. Since movements of the gripper head about the central shaft are to a large extent independent of rotation of the gripper head about the axis, the upward and downward and the rotational movements of the gripper head can be adjusted separately by adapting the shape of the cam discs. By adjusting the shape of the second cam disc, it is possible to slow down the rotational speed of the gripper head when it picks up and puts down the product, so that gradual transfers without jolting and risks of the product shifting or becoming detached are obtained. Orientation of the gripping member by means of the second cam disc allows a product to be turned within a relatively small displacement path of the gripper head. Furthermore, the gripper heads can easily be removed for maintenance and/or replacement, and the second cam discs for rotating the gripping, member are easy to exchange in order to obtain different product orientations.

In one embodiment of a gripper device according to the invention, the suspension member is connected to a spring element for exerting a rotational restoring force around the axis. As a result of the second cam wheel rolling along the running surface of the second cam disc, the gripping member can be rotated 90° about its axis counter to the force of the torsion spring. As a result of the spring force, the second cam wheel bears closely against the running surface of the second cam disc, and the gripper head is quickly and accurately restored to its starting position. The torsion spring provides a simple and compact drive for the gripping member about the axis of the gripper head.

In a further embodiment of a gripper device according to the present invention, the first cam disc comprises two separate running surfaces, between which the cam rollers for a downward and upward displacement, respectively, of the gripper head are accommodated. By allowing the vertical displacement of the gripper head to take place via the running surfaces of the first cam disc, it is possible for the cam rollers to be accommodated in a tight-fitting manner without the load which they exert increasing excessively, as is the case if the cam roller for the vertical displacement is pressed against the cam disc under spring load.

In a further embodiment of a gripper device according to the invention, a plurality of gripper heads are attached to a support which can rotate about the central shaft, which support is suspended from a vertical arm which is supported on a base. The gripper device can be placed above any desired conveyor belt. Also, the gripper device can easily be displaced with respect to the conveyor belt, for example in order to replace the cam disc.

The gripper heads can be activated in succession by means of a vacuum port, so that different turning patterns are obtained.

Figure 2:
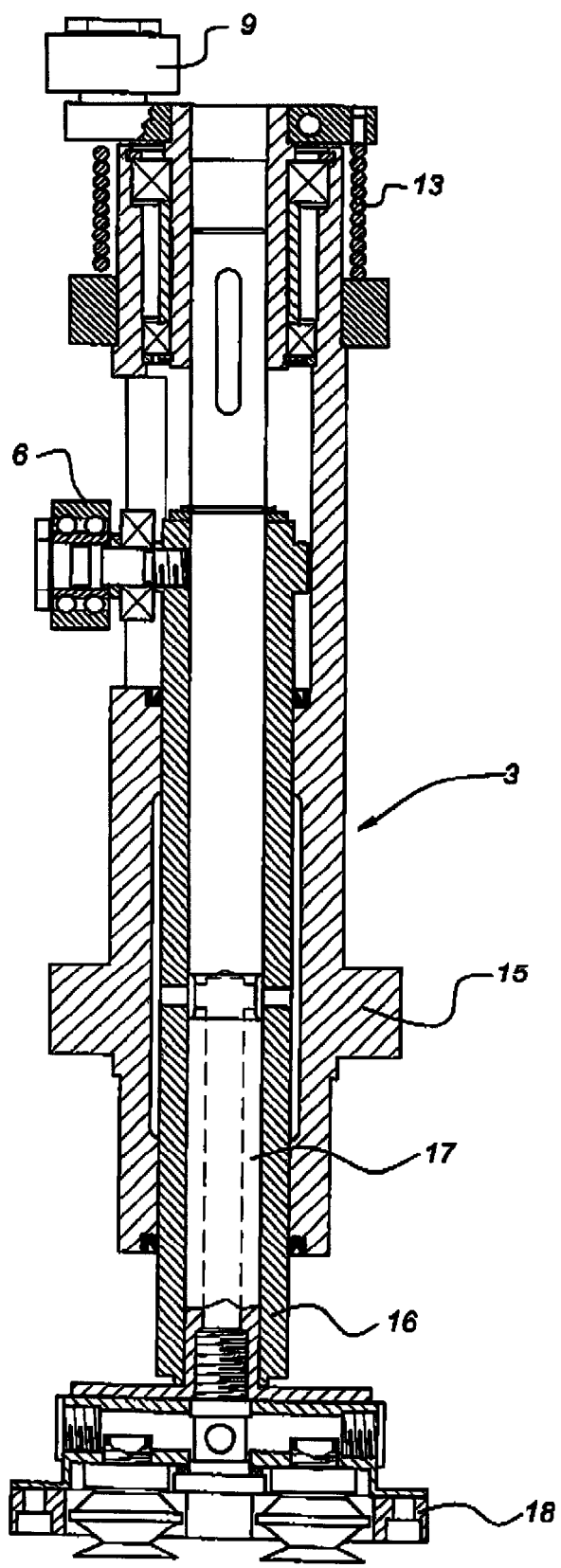

One embodiment of a gripper head according to the invention will be explained in more detail with reference to the appended drawing, in which:

FIG. 1 shows a side view, in cross section, of a gripper device according to the present invention, FIG. 2 shows a longitudinal section through a gripper head according to the present invention, FIG. 3 shows a plan view of a vacuum distributor plate, FIGS. 4a–4f diagrammatically depict various product displacement patterns, according to the way in which the gripper heads are activated, and FIG. 5 shows the pneumatic circuit diagram of the gripper heads.

FIG. 1 shows a gripper device 1 provided with gripper heads 2, 3 which are positioned above a conveyor belt 5. The gripper heads 2, 3 can rotate about a central shaft 4 and are suspended from a common support 19 which is driven by an electric motor 44 via toothed disc 42 and toothed belt 43. The support 19 is attached to a vertical column 14. In the event of rotation about the central shaft 4, the first cam wheels 6, 7 roll along running surfaces 8', 8" of a first cam disc 8, so that the height of the gripper heads above the conveyor belt 5 is varied between a lowered, gripping position and a raised, conveying position. Second cam wheels 9, 10 rotate along a second cam disc 12, so that the angular position of a suction member 18 of the gripper heads 2, 3 is varied through rotation of a support shaft 17, which is connected to the cam wheels 9, 10, about its axis. The cam wheels 9, 10 are clamped against the cam disc 11 by torsion springs 12, 13, which torsion springs exert a restoring force which is directed about the axis of the respective gripper head.

The gripper heads 1, 3 can be displaced vertically together via cylinders 40, 41.

FIG. 2 shows a longitudinal section through the gripper head 3 with an external support bush 15 and an internal sliding bush 16 which can slide to and fro vertically inside the bush 15 and can rotate about its axis with respect to the external bush. A support shaft 17, a first end of which is connected to the torsion spring 13 and the second end of which bears the vacuum suction member 18, is accommodated rotatably inside the sliding bush 16.

FIG. 3 shows a support 20 with six gripper heads 21, 21', which are each connected via a vacuum line 22, 22' to a port A and to vacuum ports B, C, D or E of a stationary distributor plate 23. The vacuum ports B–E are in communication with a vacuum source and can be activated separately. The port A is connected to an excess pressure source in order to rapidly eliminate the vacuum on the suction member and to release the products quickly when they have reached their desired orientation.

If none of the ports A, B, C, D and E are under a vacuum, no products are picked up and products supplied along a conveying direction T1 will be passed through without being reoriented, as shown in FIG. 4a.

If only port E is activated, so that this port is connected to a vacuum source, the grippers 21, 21' will pick up and rotate every second product, so that the alternating product orientation shown in FIG. 4b is obtained.

If ports C and E are activated, all the products are lifted and rotated, so that the product orientation shown in FIG. 4c is obtained.

If ports C, D and E are activated, all the products will be lifted, and half the products will be turned and passed on in the conveying direction T1, while the other half of the products will be turned and passed on in the conveying direction T2. This is shown in FIG. 4d.

If ports D and E are activated, half the products are not lifted and are allowed to pass through in the conveying direction T1, while the other half are lifted and rotated, then delivered in the conveying direction T2. This is shown in FIG. 4e.

If ports B, C, D and E are activated, all the products are lifted and rotated before being passed on in the conveying direction T2. This is shown in FIG. 4f.

As shown in FIG. 5, port A of the gripper device is connected to vacuum source 30 via a line 31, via respective mechanically actuable, spring-loaded 3/2 slide valves 32, 33, ports B and C are connected to the vacuum source 30 via mechanically actuable 5/2 slide valve 34. Ports D and E are connected to 3/2 slide valves 35 and 36, which are connected to the vacuum source 30 via 5/2 slide valve 37. The lifting cylinders 40, 41 are connected to the line 31 via respective lines and a 5/2 slide valve 45.

What is claimed is:

1. Rotatable gripper device (1) for picking up and rotating a product which is supplied on a conveyor belt, comprising a gripper head (2, 3) with a gripping member (18) which can rotate about a vertical central shaft (4) and about an axis of the gripper head (2, 3), and a cam wheel (6, 7) which is connected to the gripping( member (18) and runs over a running surface (8', 8") of a cam disc (8) which is located transversely on the central shaft (4), when the gripper head (2, 3) rotates about the central shaft (4), the position of which running surface (8', 8") varies alone the central shaft (4) in a circumferential direction around the central shaft, for the purpose of displacing the gripping member (18) between a lowered gripping position and a retracted conveying position, characterized in that the gripper head (2, 3) comprises a support bush (15) in which a sliding bush (16), to which the cam wheel (6, 7) is attached, is slidably mounted, the support bush (15) being provided with an opening through which the cam wheel projects in the radial direction to outside the support bush, a suspension member (17) being accommodated rotatably inside the sliding bush (16), with the gripping member (18) at a bottom end, to which suspension member (17) a second cam wheel (9, 10) is connected, and the gripper device (18) being provided with a second cam disc (11), which lies transversely with respect to the central shaft (4), against which the second cam wheel (9, 10) is supported and which has a running surface, the distance of which from the central shaft (4) varies in the circumferential direction about the central shaft (4), for rotation of the gripping member (18) about the axis of the gripper head (2, 3) when the gripper head (2, 3) rotates about the central shaft (4).

2. Rotatable gripper device (1) according to claim 1, characterized in that the suspension member (17) is connected to a spring element (12, 13) for exerting a rotational restoring force, which is directed about the axis of the gripper head (2, 3), on the suspension member (17).

3. Rotatable gripper device (1) according to claim 1, in which the first cam disc (8) comprises two spatially separate running surfaces (8, 8'), between which the cam roller (6, 7) is accommodated for a downward displacement and an upward displacement, respectively, of the gripper member (18).

4. Rotatable gripper device (1) according to claim 1, characterized in that various gripper heads (2, 3) are attached to a support (19) which can rotate about the central shaft (4), which support is suspended from a vertical arm (14) which is supported on a base.

5. Rotatable gripper device (1) according to claim 1, characterized in that the gripper device is provided with vacuum switching means (23) for gripping, and releasing a product which has been picked up as a function of the angular position of the gripper head (2, 3) with respect to the central shaft (4).

6. Rotatable gripper device (1) according to claim 5, characterized in that the (dripper head (21, 21') comprises a vacuum port (22, 22') which, in the event of rotation about the central shaft (4), can be displaced along a stationary distributor plate (23), in which distributor plate (23) two or more slot-like openings (A, B, C, D, E), which are in closable communication with a vacuum source, are arranged in succession in a circumferential direction.

7. Rotatable gripper device (1) accordions to claim 6, characterized in that the distributor plate (23) comprises at least two pairs of slots which are located at different radial positions on the distributor plate (23), the vacuum port of a first gripper head being able to rotate past the first pair of slots (B, C), and the vacuum port of an adjacent gripper head being able to rotate past the second pair of slots (D), E).

* * * * *